Patented Sept. 18, 1934

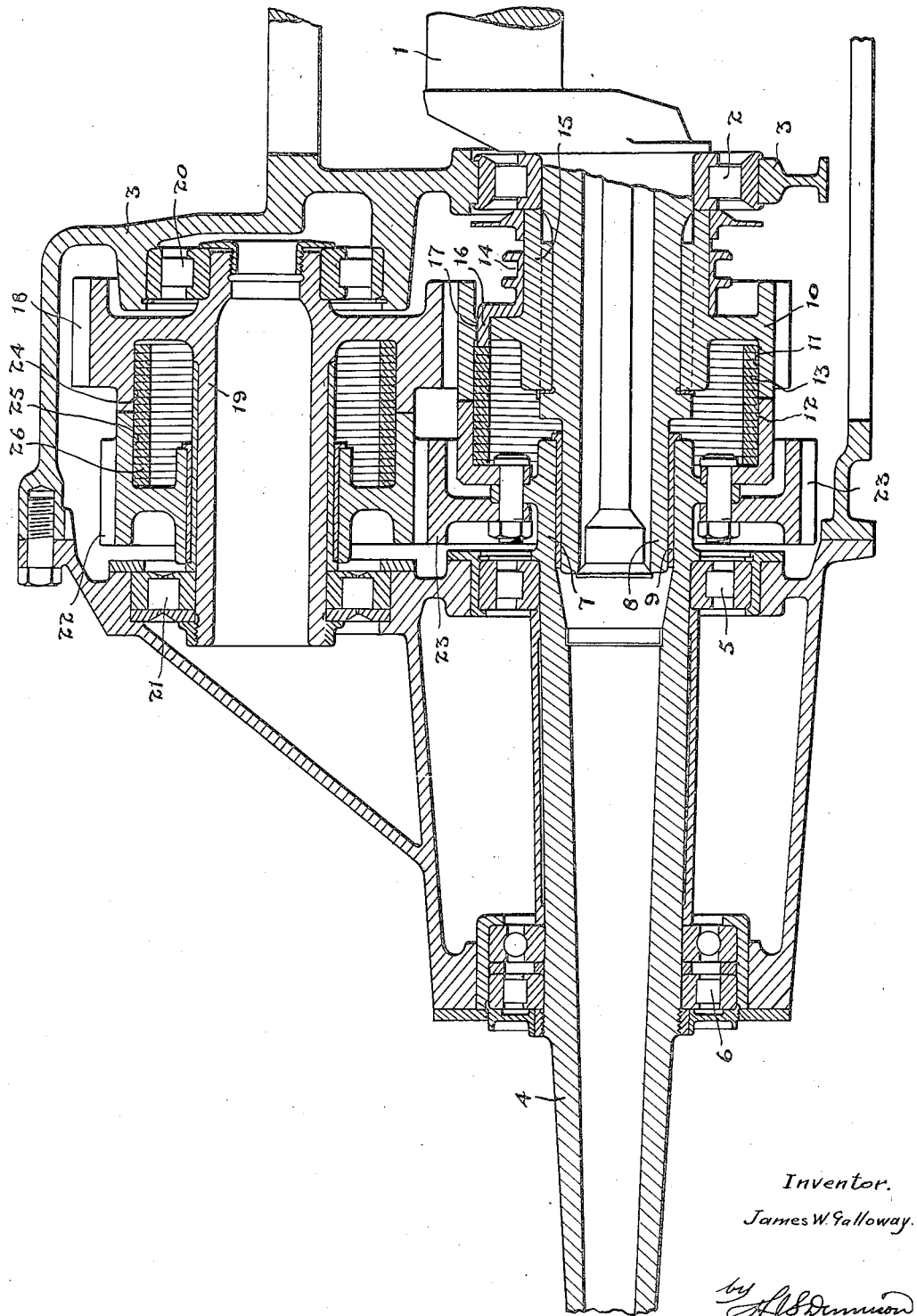

1,974,267

UNITED STATES PATENT OFFICE 1,974,267

CHANGE SPEED MECHANISM

James W. Galloway, Hamilton, Ontario, Canada, assignor to Galloway Engineering Company, Limited, Hamilton, Ontario, Canada Application January 17, 1931, Serial No. 509,327

5 Claims. (Cl. 74—59)

The principal objects of this invention are to provide a simple and efficient mechanism for accomplishing a change of speed in a driven member which will be light in weight and easily controlled and will be particularly applicable to aircraft propulsion.

The principal feature of the invention consists in the novel combination and arrangement of over-running clutch elements in cooperative association with the driving and driven members and in the gear reduction train whereby the drive may be transmitted at will either directly or through the reduction gears by locking or releasing one of said clutches.

The drawing represents a longitudinal mid-section of the preferred form of the mechanism as applied to an engine and propeller shaft.

In the form of the invention shown, the crank shaft 1 is journalled in a bearing 2 in the frame 3 forming part of the engine base and the propeller shaft 4 journalled in bearings 5 and 6 is formed with a tubular end 7 which is telescoped by the end 8 of the crank shaft and a sleeve bearing 9 is arranged between the telescoping shaft ends.

A gear 10 is keyed on the crank shaft 1 and is provided with a cylindrical recess or cup 11 and a flanged ring 12 with an internal diameter substantially corresponding to that of the cup 11, is secured to the propeller shaft in axial alignment with the cup 11, and with its end surface abutting the end surface of said cup 11.

A helical spring 13 preferably formed with closely wound coils is fitted into the cups 11 and 12 and forms an operating clutch adapted to connect the two members. The end of the spring 13 housed within the cup 12 is ground to a slightly larger diameter than the interior of the cylindrical wall of the cup 12 so that when placed therein the outer surface of its coils will frictionally engage the same and the end of the spring housed within the cup 11 is ground to a free running fit with the cylindrical surface encircling same.

A channeled ring 14 slidably mounted on the hub 15 of the gear 10 is provided with a lug 16 which slidably extends through a hole 17 in the web of the gear and is adapted to engage the terminal end of the helical spring housed in the cup 11. When the gear 10 is rotated the lug 16 engages the end of the spring and as the spring is held from rotation in the cup 12 by frictional contact, the pressure of the lug against the spring causes it to expand and grip the cylindrical surface of the cup 11 and an effective, direct connected drive is established between the driving and driven shafts.

A gear 18 formed with an elongated hub 19 journalled in bearings 20 and 21 in the frame 3, meshes with the gear 10, and a gear 22, having a lesser pitch diameter than the gear 18, is rotatably mounted on the hub 19 and meshes with a gear 23 rigidly mounted on the propeller shaft 4.

The gears 18 and 22 are each formed with abutting flanges forming the cylindrical cup recesses 24 and 25 respectively and a helical spring 26 similar to the spring 13 is housed therein. The outer surface of the spring coils is ground to a uniform diameter slightly larger than the interior diameter of the cups and when placed therein engages the inner walls thereof in frictional contact. This spring is wound so that the rotation of the gear 18, which always turns in the same direction, tends to expand it and cause it to grip the cup 25 of the gear 22 and turn it in unison.

If the spring clutch 13 is, through the engagement of its end by the lug 16, held in clutching contact with the cups 11 and 12 to effect the direct drive of the propeller shaft, the gears 18 and 22 will rotate idly and at different speeds, owing to their different diameters which will be equivalent to turning the cups carried thereby in opposite directions and their rotative effort will tend to wind up the clutch spring 26 and release it from clutching engagement with the cup surfaces.

By withdrawing the lug 16 from engagement with the spring 13 housed within the cups 11 and 12, the clutching action of the spring 13 is released and the driving force is applied from the gear 10 to gear 18 and through the clutch spring 26 to the gear 22 which in turn drives the gear 23 and the propeller shaft. The transmission of the driving force through the gear reduction train described drives the propeller at a lesser rate of speed than that of the driving shaft.

A change speed mechanism such as described is very compact; it adds very little weight to the power plant and it is operated instantaneously by the shifting of the lug ring through the medium of an ordinary fork lever and the change of speed ratio is effected without the necessity of disengaging the engine from the driven element.

The device is herein shown as applicable to aircraft design but the invention may be applied to many uses. Further, the coil spring type of overrunning clutch is shown, but it will be readily understood that other types of over-running clutches may be used if desired without departing from the main feature of the invention.

What I claim as my invention is:—

1. In a change speed mechanism, a driving member, a driven member each having adjacent cup receptacles, a helical spring housed in said cup receptacles and having one end engaging one cup receptacle in constant frictional engagement and the other end being a free running fit in the other receptacle, manual means for expanding said spring to engage the other cup receptacle in frictional contact, to effect "direct" driving between said driving and driven members and a gear train connecting said driving and driven members including an over-running clutch.

2. In a change speed mechanism, a driving member, a driven member each having adjacent cup receptacles of corresponding diameters disposed in opposed relation to each other, a helical spring housed in said cup receptacles and having one end engaging one cup receptacle in constant frictional engagement and the other end being a free running fit in the other receptacle, a lug slidably mounted on the driving member and movable into and out of engagement with the free running end of said spring to expand same to clutch its housing, and a gear train connecting said driving and driven members including an over-running clutch.

3. In a gear change mechanism, driving and driven shafts axially aligned, a gear fixed on the driving shaft having a cup receptacle, a gear fixed on the driven shaft having a cup receptacle, a helical spring housed in said cups one end constantly clutching the driven shaft gear cup peripherally and the other end being a free running fit in the driving shaft cup, a slidable lug extending through the end of the driving shaft cup to engage the free-running spring end to expand same, a gear meshing with the driving shaft gear and having a cup receptacle, a gear aligned axially with the latter gear and meshing with the driven shaft gear and having a cup receptacle, and a helical spring housed in the latter gear cups and having constant engaging frictional contact with both of said cups.

4. In combination, a motor shaft, a propeller shaft rotatable in relation to said motor shaft, gear sets having toothed intermeshing peripheries rotatable with the respective motor and propeller shaft and being disposed in paired axial alignment, each pair of aligned gears having concentric clutch portions leading in under the toothed periphery thereof, a helical spring clutch leading in under the toothed periphery of and co-operating with the concentric clutch portion of each pair of aligned gears, one of said helical spring clutches having a controllable clutching relation with the concentric clutch portion of one of said aligned gears, and means controlling the said clutching relation to control the driving connection between said motor and propeller shaft, the overlapped relation of the toothed gear periphery with the concentric clutch portions and co-operating portions of the helical spring clutches enabling the close-coupling of said elements and a corresponding reduction in the axial length thereof.

5. A change speed mechanism comprising two sets of intermeshing peripherally toothed gears disposed in paired axial alignment, driving and driven shafts connected respectively with said respective sets of intermeshing gears, each pair of aligned gears having opposed axially aligned cylindrical recesses opening toward each other and extending a substantial distance in under and overlapped by the toothed peripheries thereof, helical spring clutches mounted one in each opposed pair of gear recesses and extending in under and overlapped by the toothed gear peripheries for co-operative engagement with the cylindrical surface of said recesses, and control means extending between the toothed periphery of one of said gears and the axis thereof for selective engagement with the adjacent end of the spring clutch to control the clutching action thereof, the overlapped relation of the toothed gear peripheries with the cylindrical clutch portions and co-operating portions of the helical clutch springs enabling the close coupling of said elements and a corresponding reduction in the axial length thereof.

JAMES W. GALLOWAY.